United States Patent Office 3,316,205
Patented Apr. 25, 1967

3,316,205
COLORED PLASTIC COMPOSITIONS AND
COLORS THEREFOR
Chi K. Dien, Buffalo, N.Y., assignor to Allied Chemical Corporation, New York, N.Y., a corporation of New York
No Drawing. Filed Jan. 21, 1964, Ser. No. 339,117
10 Claims. (Cl. 260—41)

This invention relates to colored resin compositions. More particularly, it relates to resins pigmented with bis-acyl-perylenes.

Resins which include thermoplastics such as polystyrene, polymethylmethacrylate, polyvinylchloride and copolymers, polyethylene, polypropylene, polyamides such as polycaproamides, fluorohydrocarbons polymers, cellulosic esters and ethers; and thermosetting resins, such as silicones, melamine urea, melamine formaldehyde, comprise a large and commercially valuable class of synthetic materials. Plastic substances of this class, because of the characteristic property of flowing under the influence of heat and pressure, have been used in molding and extrusion processes to form a myriad of useful articles, many of which contain pigmentary substances. Because of the trend toward the use of higher processing temperatures and pressures, organic colorants formerly suitable for the purpose of reason of their capability of withstanding the processing conditions without noticeable shade alteration or loss of fastness properties, have proven to be unsatisfactory to meet the current, more severe demands, and as a result have been eliminated from use in such resins.

In general, the condition employed in the processing of resins are too drastic for most organic pigments and hence inorganic substances, such as carbon black, iron oxides, cadmium selenides and the like have been used to impart color to synthetic resins. However, inorganic pigments give colorations lacking in brightness and clarity which are desirable in many resin applications. Only a relatively few organic pigments of the prior art can be used in resins successfully.

Furthermore, due to reactions between the organic pigment and the catalysts, antioxidants, preservatives, fungicides, vulcanizates, and other special additives to such resin compositions, which become increasingly important as the processing conditions are made the more severe, the list of suitable pigments has grown even smaller.

In accordance with the invention novel compositions are provided containing a synthetic resin and an organic pigment compatible with the resin. These compositions are stable to heat up to about 700° F., and possess good fastness to light. The organic pigments of the invention are represented by the following formula:

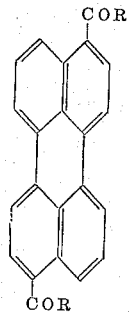

wherein —COR is an acyl radical in which R is an aliphatic radical such as methyl, ethyl, propyl, butyl, amyl, octyl, stearyl, benzyl; a cycloaliphatic radical, such as cyclopentyl, cyclohexyl, methyl cyclohexyl; an aromatic radical such as phenyl, tolyl, xylyl, mesityl, chlorophenyl, methoxyphenyl, naphthyl, perylenyl, or a heterocyclic radical such as pyridyl, quinolyl, and furyl.

I am not aware of any polymeric or copolymeric resin compositions, or monomers and comonomers, respectively, therefor in which the novel colorants of the invention could not be satisfactorily incorporated. It is conceivable, however, that there may be some compounds which may prove chemically incompatible with the bis-acyl-perylenes of the invention by reacting therewith. Such situations, when they occur, can be readily recognized by the average expert in the art. Similarly, there may be some resin compositions which require molding or processing temperatures higher than would be tolerated by the novel ketones in the particular chemical surroundings. For the foregoing reasons, the synthetic resins which can be suitably colored by the bis-acyl-perylenes described above are those which by virtue of their chemical composition and of their usual processing temperature may be pigmented with the novel colorants of the invention without chemical reaction or decomposition.

The coloring compounds of the invention are indicated as being substituted in the 3,9-positions of the perylene nucleus. The preferred method of preparing these substituted derivatives of perylene utilizes perylene dicarboxylic chloride as a starting material. Perylene dicarboxylic chloride, in turn is prepared from perylene dicarboxylic acid which can be obtained by heating 3,4,9,10-perylene tetracarboxylic acid in aqueous solution with an acid binding agent or a salt in a neutral or alkaline aqueous solution, for instance, in accordance with British Patent No. 272,528. By this process a mixture comprising a major amount of 3,9-perylene dicarboxylic acid and a minor amount of 3,10-perylene dicarboxylic acid can be obtained, the relative amounts thereof being dependent to a large degree upon the particular conditions of alkalinity, temperature, and time of the decarboxylation procedure. The compounds obtained from these dicarboxylic acid isomers, more particularly perylene dicarboxylic chloride and the pigments of the invention are, therefore, a mixture of compounds substituted in the 3,9- and 3,10-positions. While the major amounts are substituted in the 3,9-positions, respectively, in the derivatives, and it is preferred that the perylene dicarbonyl chloride starting material contain as little as possible of the 3,10-perylene dicarboxylic chloride, it is intended by referring to substitution in the 3,9-positions throughout this disclosure, to also include mixtures thereof with isomers substituted in the 3,10-positions.

The preferred compound of the present invention is the novel compound 3,9-bis-mesitoylperylene which has the following formula:

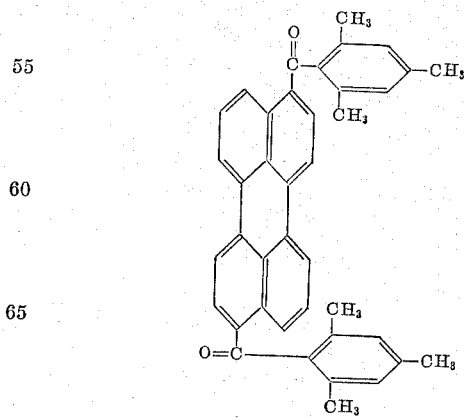

This compound gives clear bright yellow shades which are devoid of the characteristic fluorescence of perylene derivatives, and which shades in thermoplastic resins are stable to the effects of heat and light. This compound possesses also high tinctorial power.

In accordance with a preferred mode of carrying out my invention, a mixture of 3,9-bis-mesitoylperylene which can contain minor amounts of the 3,10 isomer diketone, as indicated hereinabove, is admixed in a finely divided state with a resin in a comminuted state. The mixture is tumbled to surface coat the resin with pigment, and the coated resin is fed to a suitable molding or extrusion apparatus operating at a temperature within the range of about 400° F. and about 600° F. The thus formed resin is obtained in clear bright yellow shades which show no fluorescence and no evidence of shade alteration. Alternatively, the pigment can be dissolved or suspended in a resin monomer containing a suitable catalyst, e.g., benzoyl peroxide, and the monomer mass is then heated to induce polymerization in the usual manner. The resultant polymerized composition can be formed in any suitable manner, e.g., molded, extruded, or spun. The thus formed article has properties substantially identical with that formed by pigmenting the polymer.

The amount of bis-acyl perylene derivative which can be incorporated into the resin, or the monomer, thereof, can vary over a wide range. The particular amount used is dependent upon the depth of yellow shade desired. Thus light tints (pastel shades) can be obtained with amounts of these compounds as low as 0.0001 part or less pigment per 100 parts (wt.) of resin composition. Deep shades, such as for master batches are obtained when up to about 3.0 parts or more pigment per 100 parts of resin composition are used. Master batches are prepared by addition of relatively large amounts of pigment in uncolored resin or monomer, such as 0.1 to 3.0 parts or more, preferably 0.3 to 1.0 part pigment per 100 parts of resin. After processing, the pigmented batch is comminuted and then subsequently admixed with unpigmented resin. This mixture can then be processed, such as by molding, extruding, spinning, etc., to a product of any desired lighter yellow shade. The invention thus contemplates the addition of from extremely minute amounts of a bis-acyl perylene compound to relatively large amounts of said compound to the resin which will be limited only by the compatibility of the pigment with the particular resin or monomer being colored. The maximum amounts, as will be obvious to those skilled in this art, can vary to a considerable degree from resin to resin.

The processing of the resin-pigment composition can be accomplished by known methods. For example, pellets, beads or rods, which are the usually available commercial forms of the polymer, can be surface coated by mixing the pigment and polymer in a suitable mixer and the thus coated polymer fed to a suitable molding press, extruder, melt spinner or the like. Alternatively, an aqueous paste or solvent solution of the pigment can be admixed with the comminuted resin, the mixture dried, and the dried mix, after additional mixing if desired, for example, in a ribbon mixer, fed to a molding press, etc. The pigment can also be dissolved or suspended in the resin monomer composition and the resulting solution or suspension is then polymerized and formed in one or separate operations, as is customary.

Bis-acyl-perylenes, except for 3,9-mesitoylperylene, are known compounds and can be prepared by condensing 3,9-perylene dicarbonyl chloride and a hydrocarbon, or perylene and an acyl halide in the presence of a Friedel-Crafts catalyst such as aluminum chloride. The preferred procedure for the preparation of 3,9-bis-mesitoyl-perylene involves the condensation of the hydrocarbon, mesitylene, with 3,9-perylene dicarbonyl chloride.

The following examples describe specific embodiments of the invention and illustrate the best mode contemplated of carrying it out; but are not to be interpreted as limiting the invention to all details of the examples. All parts and percentages are by weight.

Example 1

A mixture of 8 parts 3,9-perylene dicarboxylic acid prepared in accordance with British Patent No. 272,528, 15 parts phosphorous pentachloride and 120 parts nitrobenzene were heated to and maintained at 170° to 175° C. for two hours. The mixture was then cooled to 30° C., filtered and sucked as dry as possible. The filter cake, containing primarily 3,9-perylene dicarbonyl chloride, was reslurried in 60.56 parts mesitylene until a homogeneous paste was obtained. To this was added 12 parts of anhydrous aluminum chloride during about 5 minutes. The temperature of the resultant mixture rose to about 50° C. during this addition and the color of the mass changed from a bright red to bluish-violet. The mass was heated to and maintained at 100° to 110° C. for 30 minutes, cooled to ambient temperature and agitated for about 16 hours.

The mixture was drowned in about 500 parts of 5% aqueous solution of hydrochloric acid and the drowned mixture was agitated until the dark solid completely decomposed into a yellow crystalline precipitate in about 2 hours. The crystalline slurry was filtered and washed with about 150 parts of ethanol and then with water until acid-free, as indicated by Congo red. After being washed with about 40 parts of ethanol, the washed cake was recrystallized from Solvent 74 (a commercial mixture consisting essentially of o-dichlorobenzene). The golden yellow crystalline precipitate, 3,9-bis-mesitoylperylene, was soluble in a mixture of xylene and butanol giving a bright yellow solution with a faint greenish fluorescence. It was insoluble in ethanol.

Example 2

A mixture of 100 parts of polystyrene pellets and 0.05 part of 3,9-bis-mesitoylperylene was placed in a covered metal container. This was tumbled mechanically for about 5 minutes to surface coat the resin with pigment. Thereafter the coated resin was fed to a laboratory extruder and extruded therefrom through a die heated to 600° F. in the form of a 1/8" diameter continuous rod. The clear bright yellow rods were pelletized and then placed in an injection molding press operating at about 400° F. The resin was formed therein into a plaque approximately 2" x 3" x 1/4". The clear yellow plaque showing no alteration in shade was exposed in the Fade-O-Meter for 160 hours in accordance with ASA Standard Test No. L 14.53–1961. No shade change between the exposed and unexposed samples was noticeable. The pigmented plaque did not fluoresce when exposed to daylight.

Example 3

The procedure of Example 2 above is repeated using a like amount of polymethylmethacrylate rods instead of the polystyrene. The surface coated polymer is extruded at about 350° F. and molded at about 325° F.

The polymer on extrusion is colored a clear bright pure yellow, indicating excellent stability at the relatively high extrusion temperature of 350° F. The molded plaque possesses excellent fastness to light.

Example 4

A mixture of 100 parts of monomethyl methacrylate, 0.1 part of benzoyl peroxide and 0.01 part of 3,9-bis-mesitoyl-perylene is heated on a steam bath until vigorous boiling occurs. The mixture is removed from the steam bath, and after the boiling subsides, the mixture is placed in a warm oven (140° F.) for about 16 hours. Thereafter the polymerization reaction is completed by heating the mass on a steam bath for about one hour. The pigmented polymer is then extruded into rods as described in Example 3 above. The colored product obtained is substantially similar in all respects to that of Example 3.

The presence of the 3,9-bis-mesitoyl perylene in the monomeric composition does not interfere with the polymerization reaction to any noticeable extent nor does the peroxide catalyst cause any alteration in the shade of the pigmented composition.

*Examples 5–12*

The procedure of Example 2 is repeated using the several bis-acyl perylenes, listed below, in place of 3,9-bis-mesitoyl perylene as the pigment. In each instance, clear yellow colored polystyrene having excellent heat stability and fastness to light is obtained.

(5) 3,9-bis acetyl perylene
(6) 3,9-bis benzoyl perylene
(7) 3,9-bis stearoyl perylene
(8) 3,9-bis naphthoyl perylene
(9) 3,9-bis(p-chlorobenzoyl)perylene
(10) 3,9-bis(o-toluyl)perylene
(11) 3,9-bis(3-nicotinoyl)perylene
(12) 3,9-bis(cyclohexanoyl)perylene

I claim:

1. A colored composition comprising a synthetic resin, and a compound having the formula

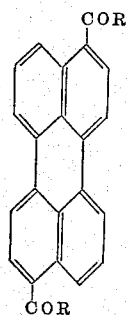

COR being an acyl radical wherein R is a group selected from the class consisting of aliphatic, cycloaliphatic, aromatic, and heterocyclic groups.

2. A composition comprising a synthetic resin, and a 3,9-bis-acyl perylene.

3. The composition of claim 2, wherein said 3,9-bis-acyl perylene is a member selected from the group consisting of 3,9-bis-mesitoylperylene; 3,9-bis acetyl perylene; 3,9-bis benzoyl perylene; 3,9-bis stearoyl perylene; 3,9-bis naphthoyl perylene; 3,9-bis(p-chlorobenzoyl)perylene; 3,9-bis(o-toluyl)perylene; 3,9-bis(3-nicotinoyl)perylene, and 3,9-bis(cyclohexanoyl)perylene.

4. The composition of claim 2, wherein said synthetic resin is a thermoplastic synthetic resin.

5. The composition of claim 4, wherein said synthetic resin is a member of the group consisting of polystyrene, and polymethylmethacrylate.

6. The composition of claim 3, wherein said synthetic resin is a member of the group consisting of polystyrene and polymethylmethacrylate.

7. A composition comprising a synthetic resin, and between 0.0001 and 5 parts by weight per 100 parts by weight of said resin of a 3,9-bis-acyl perylene.

8. The composition of claim 7, wherein said 3,9-bis-acyl perylene is present in a concentration of 0.3–1.0 part by weight per 100 parts by weight resin.

9. A process for coloring a synthetic resin, which comprises incorporating into the monomer or polymer form of the resin a pigment selected from the group consisting of 3,9-bis-mesitoylperylene; 3,9-bis acetyl perylene; 3,9-bis benzoyl perylene; 3,9-bis stearoyl perylene; 3,9-bis naphthoyl perylene; 3,9-bis(p-chlorobenzoyl)perylene; 3,9-bis(o-toluyl)perylene; 3,9-bis(3-nicotinoyl)perylene; and 3,9-bis(cyclohexanoyl)perylene.

10. The composition of claim 2 wherein the 3,9-bis-acyl perylene is 3,9-bis-mesitoylperylene.

References Cited by the Examiner
UNITED STATES PATENTS
2,037,793   4/1936   Jacobson _____ 106—22

MORRIS LIEBMAN, *Primary Examiner.*

J. S. WALDRON, S. L. FOX, *Assistant Examiners.*